(12) United States Patent
Chelba et al.

(10) Patent No.: US 8,965,763 B1
(45) Date of Patent: Feb. 24, 2015

(54) DISCRIMINATIVE LANGUAGE MODELING FOR AUTOMATIC SPEECH RECOGNITION WITH A WEAK ACOUSTIC MODEL AND DISTRIBUTED TRAINING

(75) Inventors: Ciprian Ioan Chelba, Mountain View, CA (US); Brian Strope, Mountain View, CA (US); Preethi Jyothi, Columbus, OH (US); Leif Johnson, Austin, TX (US)

(73) Assignee: Google Inc., Mountain View, CA (US)

( * ) Notice: Subject to any disclaimer, the term of this patent is extended or adjusted under 35 U.S.C. 154(b) by 195 days.

(21) Appl. No.: 13/461,093

(22) Filed: May 1, 2012

Related U.S. Application Data

(60) Provisional application No. 61/594,068, filed on Feb. 2, 2012.

(51) Int. Cl.
*G10L 15/26* (2006.01)
*G10L 15/32* (2013.01)
*G10L 15/06* (2013.01)

(52) U.S. Cl.
USPC ............ 704/244; 704/231; 704/235; 704/251

(58) Field of Classification Search
USPC ................................ 704/231–257, 258–269, 704/E15.001–E15.05
See application file for complete search history.

(56) References Cited

U.S. PATENT DOCUMENTS

| | | | | |
|---|---|---|---|---|
| 4,741,036 | A * | 4/1988 | Bahl et al. ...................... | 704/256 |
| 4,956,865 | A | 9/1990 | Lennig et al. | |
| 5,233,681 | A * | 8/1993 | Bahl et al. ...................... | 704/251 |
| 5,257,314 | A | 10/1993 | Kimura et al. | |
| 5,428,707 | A * | 6/1995 | Gould et al. ................... | 704/231 |
| 5,606,644 | A * | 2/1997 | Chou et al. ..................... | 704/243 |
| 5,625,748 | A | 4/1997 | McDonough et al. | |
| 5,675,704 | A * | 10/1997 | Juang et al. .................... | 704/246 |
| 5,799,276 | A * | 8/1998 | Komissarchik et al. ....... | 704/251 |
| 5,864,810 | A | 1/1999 | Digalakis et al. | |
| 5,895,447 | A | 4/1999 | Ittycheriah et al. | |
| 6,064,959 | A * | 5/2000 | Young et al. ................... | 704/251 |
| 6,073,097 | A * | 6/2000 | Gould et al. ................... | 704/251 |
| 6,085,160 | A | 7/2000 | D'Hoore et al. | |
| 6,138,095 | A | 10/2000 | Gupta et al. | |
| 6,167,377 | A * | 12/2000 | Gillick et al. ................. | 704/240 |
| 6,224,636 | B1 * | 5/2001 | Wegmann et al. ............ | 704/246 |

(Continued)

OTHER PUBLICATIONS

Collins and Koo, "Discriminative Reranking for Natural Language Parsing," Computational Linguistics, vol. 31, No. 1, pp. 25-70 (Mar. 2005).

(Continued)

*Primary Examiner* — Pierre-Louis Desir
*Assistant Examiner* — David Kovacek
(74) *Attorney, Agent, or Firm* — McDonnell Boehnen Hulbert & Berghoff LLP

(57) ABSTRACT

Training data from a plurality of utterance-to-text-string mappings of an automatic speech recognition (ASR) system may be selected. Parameters of the ASR system that characterize the utterances and their respective mappings may be determined through application of a first acoustic model and a language model. A second acoustic model and the language model may be applied to the selected training data utterances to determine a second set of utterance-to-text-string mappings. The first set of utterance-to-text-string mappings may be compared to the second set of utterance-to-text-string mappings, and the parameters of the ASR system may be updated based on the comparison.

23 Claims, 10 Drawing Sheets

(56) References Cited

U.S. PATENT DOCUMENTS

| | | | |
|---|---|---|---|
| 6,236,963 B1 | 5/2001 | Naito et al. | |
| 6,334,102 B1 | 12/2001 | Lewis et al. | |
| 6,418,411 B1 | 7/2002 | Gong | |
| 6,519,562 B1* | 2/2003 | Phillips et al. | 704/240 |
| 6,539,353 B1* | 3/2003 | Jiang et al. | 704/254 |
| 6,567,776 B1 | 5/2003 | Chang et al. | |
| 6,804,647 B1 | 10/2004 | Heck et al. | |
| 6,865,528 B1 | 3/2005 | Huang et al. | |
| 6,901,364 B2 | 5/2005 | Nguyen et al. | |
| 7,062,436 B1 | 6/2006 | Odell et al. | |
| 7,092,888 B1 | 8/2006 | McCarthy et al. | |
| 7,206,389 B1* | 4/2007 | Dumoulin et al. | 379/88.04 |
| 7,418,386 B2 | 8/2008 | Lai et al. | |
| 7,437,296 B2 | 10/2008 | Inoue et al. | |
| 7,584,102 B2 | 9/2009 | Hwang et al. | |
| 7,668,718 B2 | 2/2010 | Kahn et al. | |
| 7,680,659 B2 | 3/2010 | Gao et al. | |
| 7,756,708 B2* | 7/2010 | Cohen et al. | 704/244 |
| 8,014,591 B2* | 9/2011 | Baker | 382/159 |
| 8,032,537 B2 | 10/2011 | Consul et al. | |
| 8,131,543 B1* | 3/2012 | Weiss et al. | 704/233 |
| 2002/0035471 A1* | 3/2002 | Breton | 704/233 |
| 2002/0049600 A1 | 4/2002 | L'Esperance et al. | |
| 2002/0055844 A1 | 5/2002 | L'Esperance et al. | |
| 2002/0123891 A1 | 9/2002 | Epstein | |
| 2004/0088162 A1 | 5/2004 | He et al. | |
| 2004/0107099 A1* | 6/2004 | Charlet | 704/234 |
| 2004/0249628 A1* | 12/2004 | Chelba et al. | 704/4 |
| 2005/0131688 A1* | 6/2005 | Goronzy et al. | 704/240 |
| 2006/0053014 A1* | 3/2006 | Yoshizawa | 704/256.4 |
| 2006/0074664 A1* | 4/2006 | Lam et al. | 704/255 |
| 2006/0212288 A1* | 9/2006 | Sethy et al. | 704/10 |
| 2008/0177545 A1* | 7/2008 | Li et al. | 704/255 |
| 2008/0195389 A1* | 8/2008 | Zhang et al. | 704/246 |
| 2008/0215311 A1* | 9/2008 | Chelba et al. | 704/9 |
| 2008/0312926 A1* | 12/2008 | Vair et al. | 704/249 |
| 2009/0063483 A1 | 3/2009 | Chen et al. | |
| 2010/0057453 A1* | 3/2010 | Valsan | 704/232 |
| 2010/0114572 A1* | 5/2010 | Tani et al. | 704/247 |
| 2010/0169094 A1 | 7/2010 | Akamine et al. | |
| 2011/0054895 A1 | 3/2011 | Phillips et al. | |
| 2011/0055256 A1 | 3/2011 | Phillips et al. | |
| 2012/0150539 A1* | 6/2012 | Jeon et al. | 704/236 |

OTHER PUBLICATIONS

McDonald et al., "Distributed Training Strategies for the Structure Perceptron," Proceeding HLT '10 Human Language Technologies: The 2010 Annual Conference for the North American Chapter of the Association for Computational Linguistics, pp. 1-9 (2010).

Hall et al., "MapReduce/Bigtable for Distributed Optimization," Neural Information Processing Systesm Workshop on Leaning on Cores, Clusters, and Clouds, pp. 1-7 (2010).

Saraclar et al, "Joint Discriminative Language Modeling and Utterance Classification," IEEE International Conference on Acoustics, Speech and Signal Processing (ICASSP'05) vol. 1, pp. 561-564 (2005).

Roark et al., "Discriminative n-gram language modeling," Computer Speech and Language, vol. 21, pp. 373-392 (2007).

Mohri et al., "Speech Recognition with Weighted Finite-State Transducers," Springer Handbook on Speech Processing and Speech Communication, Part E, Chapter 28, pp. 1-31 (2008).

Mohri, Mehryar, "Weighted Automata Algorithms," Handbook of Weighted Automata. Monographs in Theoretical Computer Science, pp. 213-254, Springer (2009).

Goodman, Joshua T., "A Bit of Progress in Language Modeling Extended Version," Computers & Electrical Engineering, vol. 37, Issue 4, pp. 559-569 (Jul. 2011).

Roark et al., "Discriminative Language Modeling with Conditional Random Fields and the Perceptron Algorithm," ACL'04 Proceedings of the 42nd Annual Meeting on Association for Computational Linguistics, pp. 1-8 (2004).

Rabiner et al., "Introduction to Digital Speech Processing," Foundations and Trends in Signal Processing, vol. 1, Nos. 1-2, pp. 1-194 (2007).

Mohri et al., "Weighted Finite-State Transducers in Speech Recognition," Department of Computer & Information Science, Departmental Papers (CIS), University of Pennsylvania, pp. 1-13 (May 14, 2004), www.cs.nyu.edu/~mohri/pub/csl01.pdf.

Rosell, Magnus "An Introduction to Front-End Processing and Acoustic Features for Automatic Speech Recognition," pp. 1-10 (Jan. 17, 2006) Swedish national graduate school of language technology "GSLT". www.csc.kth.se/~rosell/courses/rosell_acoustic_features.pdf.

Collins, Michael, "Discriminative Reranking for Natural Language Parsing," Proc 17th International Conf on Machine Learning, vol. 31, Issue: 1, Publisher: Morgan Kaufmann, San Francisco, CA, pp. 175-182 (2000).

"A Brief Introduction to Perceptrons," pp. 1-2, www.cs.utsa.edu/~bylander/cs5233/perceptron.pdf (Accessed Apr. 20, 2012).

Glass, James and Zue, Victor, Lecture 7, Pattern Classification, pp. 1-33, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture7.pdf (Accessed Apr. 20, 2012).

Glass, James and Zue, Victor, Lecture 9, Dynamic Time Warping & Search, pp. 1-33, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture9.pdf (Accessed Apr. 20, 2012).

Glass, James and Zue, Victor, Lecture 10, Hidden Markov Modelling, pp. 1-33, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture10.pdf (Accessed Apr. 20, 2012).

Glass, James and Zue, Victor, Lecture 11-12, Language Modelling for Speech Recognition, pp. 1-47, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture1112.pdf (Accessed Apr. 20, 2012).

Glass, James and Zue, Victor, Lecture 13, A Practical Introduction to Graphical Models and their use in ASR, pp. 1-37, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture13.pdf (Accessed Apr. 20, 2012).

Glass, James and Zue, Victor, Guest Lecture 14 by Rita Singh, Part I: Designing HMM-based ASR systems, pp. 1-68, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture14.pdf (Accessed Apr. 20, 2012).

Glass, James and Zue, Victor, Guest Lecture 15 by Rita Singh, Part I: Designing HMM-based ASR systems, Part II: Training continuous density HMMS, pp. 1-66, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture15.pdf (Accessed Apr. 20, 2012).

(56) References Cited

OTHER PUBLICATIONS

Glass, James and Zue, Victor, Lecture 17, Finite-State Techniques for Speech Recognition, pp. 1-34, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture17.pdf (Accessed Apr. 20, 2012).

Glass, James and Zue, Victor, Lecture 18, ASR for Spoken-Dialogue Systems, pp. 1-34, 6.345 Automatic Speech Recognition, Spring 2003. (Massachusetts Institute of Technology: MIT OpenCourseWare), License: Creative Commons BY-NC-SA, http://ocw.mit.edu/courses/electrical-engineering-and-computer-science/6-345-automatic-speech-recognition-spring-2003/lecture-notes/lecture18.pdf (Accessed Apr. 20, 2012).

* cited by examiner

DISCRIMINATIVE LANGUAGE MODELING FOR AUTOMATIC SPEECH RECOGNITION WITH A WEAK ACOUSTIC MODEL AND DISTRIBUTED TRAINING

CROSS-REFERENCE TO RELATED APPLICATIONS

The present application claims priority to U.S. provisional patent application No. 61/594,068, filed on Feb. 2, 2012 and herein incorporated by reference in its entirety.

BACKGROUND

A goal of automatic speech recognition (ASR) technology is to map a particular utterance to an accurate textual representation of that utterance. For instance, ASR performed on the utterance "my dog has fleas" would ideally be mapped to the text string "my dog has fleas," rather than the nonsensical text string "my dog has freeze," or the reasonably sensible but inaccurate text string "my bog has trees." However, ASR may be challenging due to different individuals having different speech patterns (e.g., different accents, phrasings, and word choice). Additionally, any background noise that is recorded along with an utterance can make it more difficult to discern between the utterance and the background noise.

SUMMARY

In an example embodiment, a plurality of utterance-to-text-string mappings may be obtained. Each utterance-to-text-string mapping may include a respective utterance and a respective text string that an ASR system has output for the respective utterance using a first acoustic model, a language model, and a weight vector. A first set of utterance-to-text-string mappings may be selected from the plurality of utterance-to-text-string mappings. Each utterance-to-text-string mapping in the first set may be associated with a respective confidence level that is above a threshold confidence level. A second acoustic model and the language model may be applied to utterances in the first set of utterance-to-text-string mappings to determine a second set of utterance-to-text-string mappings. The second acoustic model may be statistically less accurate than the first acoustic model. The first set of utterance-to-text-string mappings may be compared to the second set of utterance-to-text-string mappings. The weight vector may be updated based on the comparison of the first set of utterance-to-text-string mappings to the second set of utterance-to-text-string mappings.

In another example embodiment, a plurality of storage computing devices may each be configured to store a respective set of feature vectors and to have access to a weight vector. The respective sets of feature vectors and the weight vector may be based on a plurality of utterance-to-text-string mappings. Each utterance-to-text-string mapping may include a respective utterance and a respective text string that an ASR system has output for the respective utterance using a first acoustic model, and a language model. A plurality of training computing devices may each have access to a respective partition of a first set of utterance-to-text-string mappings that (i) was selected from the plurality of utterance-to-text-string mappings, and (ii) is associated with a respective confidence level that is above a threshold confidence level. Each training computing device may be configured to apply a second acoustic model and the language model to the respective utterances of the first set to determine a second set of utterance-to-text-string mappings. Each training computing device may also be configured to compare the first set of utterance-to-text-string mappings to the second set of utterance-to-text-string mappings. At least one combining computing device may be configured to update the weight vector based on the comparison of the first set of utterance-to-text-string mappings to the second set of utterance-to-text-string mappings.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

1. Overview

Figure 1:
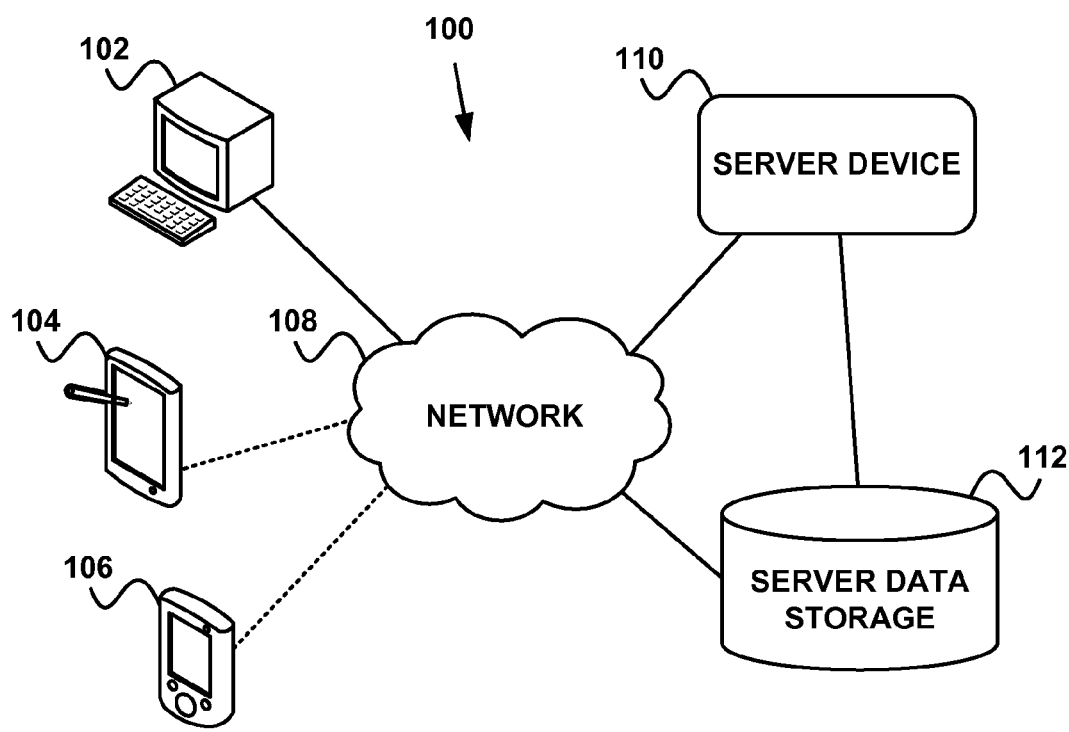
FIG. 1 depicts a distributed computing architecture, in accordance with an example embodiment.

Perfectly accurate ASR may not be practical in many scenarios. Thus, the quality of an ASR system may be measured by its error rate. An ASR system with a lower error rate may be considered to be superior to an ASR system with a higher error rate. This error rate may be measured at the phoneme level, word level, sentence level, or in some other fashion.

In order to reduce ASR error rate, a corpus of utterances may be manually transcribed to corresponding text strings. The utterances and these text strings may then be decomposed into a model that is used for ASR. Based on this model, the ASR system may be used to estimate the N-best text string mappings for any new utterance presented to the system. However, the transcription of a large corpus of utterances is a labor-intensive task that is subject to a non-negligible error rate due to human transcription mistakes. Further, even a relatively large corpus of utterances and mapped transcriptions may not contain mappings for all possible sentences of a given language.

Thus, some ASR systems include a learning component that allows the system to dynamically adapt based on feedback. Thus, for a given utterance, an ASR system may assign each text string mapping a respective confidence level. These confidence levels may be represented as a measure of the probability that the associated text string mapping is an accurate transcription of the given utterance. For example, suppose that for the utterance "my dog has fleas," the text string mapping "my dog has fleas" has a confidence level of 0.95, the text string mapping "my dog has trees" has a confidence level of 0.03, and the text string mapping "my dog has knees" has a confidence level of 0.02.

If the ASR system detects a new utterance that it evaluates as the words "my dog has fleas," the ASR system may transcribe this new utterance as the text string "my dog has fleas." The ASR system may present the user with this string, and may also present the user with the two other strings, just in case. If the user selects "my dog has trees" as the best transcription, the ASR system may adjust its weights accordingly. Consequently, for the utterance "my dog has fleas," the ASR system may set the confidence of the text string mapping "my dog has fleas" to 92% and the confidence of the text string mapping "my dog has trees" to 5%. In this way, the ASR system can learn from its users.

An ASR system may adjust its weights in either an online or offline fashion. For example, if an operating (e.g., running) ASR system receives feedback regarding one or more transcriptions that it has generated, the ASR system may adjust its weights while operating to incorporate this feedback. Therefore, the updated weights may go into effect while the ASR system is operating. On the other hand, the ASR system (or a different adjunct system or device) may receive this feedback, and the weights may be updated offline. For instance, after some amount of time has passed, or some volume of feedback has been received, the ASR system may update its weights offline to reflect some or all of this feedback. Then, a new ASR system with the updated weights may become operational.

ASR systems have been deployed in various environments. Some ASR systems are just a single machine (e.g., a personal computer) into which a user speaks utterances and the ASR system transcribes the utterances into text. Other ASR systems are client/server based, in which the user speaks an utterance into a client device, and the client device may encode the utterance and transmit it to a server device. Then, the server device may perform speech recognition on the encoded utterance, and transmit one or more text string mappings to the client device for presentation to the user. Particularly, on wireless communication devices such as mobile phones, client/server based ASR can be supported by Internet search applications, geo-location and mapping applications, text messaging and instant messaging applications, and by virtually any third-party application as well.

The server component of an ASR system may include just a single server device, or may be distributed in various ways across a number of server devices. The following section describes example client and server device(s) and an example communication system that could be used for client/server communication and processing for ASR.

2. Communication System and Device Architecture

The methods, devices, and systems described herein can be implemented using client devices and/or so-called "cloud-based" server devices. Under various aspects of this paradigm, client devices, such as mobile phones and tablet computers, may offload some processing and storage responsibilities to remote server devices. At least some of the time, these client services are able to communicate, via a network such as the Internet, with the server devices. As a result, applications that operate on the client devices may also have a persistent, server-based component. Nonetheless, it should be noted that at least some of the methods, processes, and techniques disclosed herein may be able to operate entirely on a client device or a server device.

This section describes general system and device architectures for such client devices and server devices. However, the methods, devices, and systems presented in the subsequent sections may operate under different paradigms as well. Thus, the embodiments of this section are merely examples of how these methods, devices, and systems can be enabled.

A. Communication System

FIG. 1 is a simplified block diagram of a communication system 100, in which various embodiments described herein can be employed. Communication system 100 includes client devices 102, 104, and 106, which represent a desktop personal computer (PC), a tablet computer, and a mobile phone, respectively. Each of these client devices may be able to communicate with other devices via a network 108 through the use of wireline connections (designated by solid lines) and/or wireless connections (designated by dashed lines).

Network 108 may be, for example, the Internet, or some other form of public or private Internet Protocol (IP) network. Thus, client devices 102, 104, and 106 may communicate using packet-switching technologies. Nonetheless, network 108 may also incorporate at least some circuit-switching technologies, and client devices 102, 104, and 106 may communicate via circuit switching alternatively or in addition to packet switching.

A server device 110 may also communicate via network 108. Particularly, server device 110 may communicate with client devices 102, 104, and 106 according to one or more network protocols and/or application-level protocols to facilitate the use of network-based or cloud-based computing on these client devices. Server device 110 may include integrated data storage (e.g., memory, disk drives, etc.) and may also be able to access a separate server data storage 112. Communication between server device 110 and server data storage 112 may be direct, via network 108, or both direct and via network 108 as illustrated in FIG. 1. Server data storage 112 may store application data that is used to facilitate the operations of applications performed by client devices 102, 104, and 106 and server device 110.

Although only three client devices, one server device, and one server data storage are shown in FIG. 1, communication system 100 may include any number of each of these components. For instance, communication system 100 may comprise millions of client devices, thousands of server devices and/or thousands of server data storages. Furthermore, client devices may take on forms other than those in FIG. 1.

B. Server Device

Figure 2A:
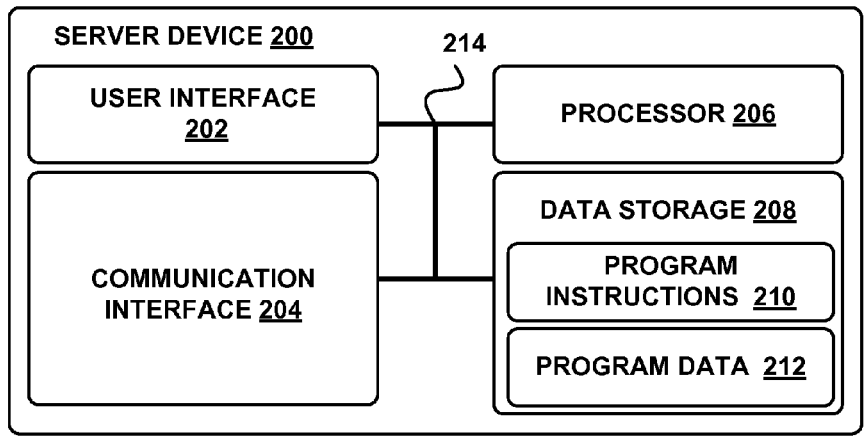
FIG. 2A is a block diagram of a server device, in accordance with an example embodiment.

FIG. 2A is a block diagram of a server device in accordance with an example embodiment. In particular, server device 200 shown in FIG. 2A can be configured to perform one or more functions of server device 110 and/or server data storage 112. Server device 200 may include a user interface 202, a communication interface 204, processor 206, and data storage 208, all of which may be linked together via a system bus, network, or other connection mechanism 214.

User interface 202 may comprise user input devices such as a keyboard, a keypad, a touch screen, a computer mouse, a track ball, a joystick, and/or other similar devices, now known or later developed. User interface 202 may also comprise user display devices, such as one or more cathode ray tubes (CRT), liquid crystal displays (LCD), light emitting diodes (LEDs), displays using digital light processing (DLP) technology, printers, light bulbs, and/or other similar devices, now known or later developed. Additionally, user interface 202 may be configured to generate audible output(s), via a speaker, speaker jack, audio output port, audio output device, earphones, and/or other similar devices, now known or later developed. In some embodiments, user interface 202 may include software, circuitry, or another form of logic that can transmit data to and/or receive data from external user input/output devices.

Communication interface 204 may include one or more wireless interfaces and/or wireline interfaces that are configurable to communicate via a network, such as network 108 shown in FIG. 1. The wireless interfaces, if present, may include one or more wireless transceivers, such as a BLUETOOTH® transceiver, a Wifi transceiver perhaps operating in accordance with an IEEE 802.11 standard (e.g., 802.11b, 802.11g, 802.11n), a WiMAX transceiver perhaps operating in accordance with an IEEE 802.16 standard, a Long-Term Evolution (LTE) transceiver perhaps operating in accordance with a 3rd Generation Partnership Project (3GPP) standard, and/or other types of wireless transceivers configurable to communicate via local-area or wide-area wireless networks. The wireline interfaces, if present, may include one or more wireline transceivers, such as an Ethernet transceiver, a Universal Serial Bus (USB) transceiver, or similar transceiver configurable to communicate via a twisted pair wire, a coaxial cable, a fiber-optic link or other physical connection to a wireline device or network.

In some embodiments, communication interface 204 may be configured to provide reliable, secured, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information such as cyclic redundancy check (CRC) and/or parity check values). Communications can be made secure (e.g., be encoded or encrypted) and/or decrypted/decoded using one or more cryptographic protocols and/or algorithms, such as, but not limited to, the data encryption standard (DES), the advanced encryption standard (AES), the Rivest, Shamir, and Adleman (RSA) algorithm, the Diffie-Hellman algorithm, and/or the Digital Signature Algorithm (DSA). Other cryptographic protocols and/or algorithms may be used instead of or in addition to those listed herein to secure (and then decrypt/decode) communications.

Processor 206 may include one or more general purpose processors (e.g., microprocessors) and/or one or more special purpose processors (e.g., digital signal processors (DSPs), graphical processing units (GPUs), floating point processing units (FPUs), network processors, or application specific integrated circuits (ASICs)). Processor 206 may be configured to execute computer-readable program instructions 210 that are contained in data storage 208, and/or other instructions, to carry out various functions described herein.

Data storage 208 may include one or more non-transitory computer-readable storage media that can be read or accessed by processor 206. The one or more computer-readable storage media may include volatile and/or non-volatile storage components, such as optical, magnetic, organic or other memory or disc storage, which can be integrated in whole or in part with processor 206. In some embodiments, data storage 208 may be implemented using a single physical device (e.g., one optical, magnetic, organic or other memory or disc storage unit), while in other embodiments, data storage 208 may be implemented using two or more physical devices.

Data storage 208 may also include program data 212 that can be used by processor 206 to carry out functions described herein. In some embodiments, data storage 208 may include, or have access to, additional data storage components or devices (e.g., cluster data storages described below).

C. Server Clusters

Server device 110 and server data storage device 112 may store applications and application data at one or more places accessible via network 108. These places may be data centers containing numerous servers and storage devices. The exact physical location, connectivity, and configuration of server device 110 and server data storage device 112 may be unknown and/or unimportant to client devices. Accordingly, server device 110 and server data storage device 112 may be referred to as "cloud-based" devices that are housed at various remote locations. One possible advantage of such "could-based" computing is to offload processing and data storage from client devices, thereby simplifying the design and requirements of these client devices.

In some embodiments, server device 110 and server data storage device 112 may be a single computing device residing in a single data center. In other embodiments, server device 110 and server data storage device 112 may include multiple computing devices in a data center, or even multiple computing devices in multiple data centers, where the data centers are located in diverse geographic locations. For example, FIG. 1 depicts each of server device 110 and server data storage device 112 potentially residing in a different physical location.

Figure 2B:
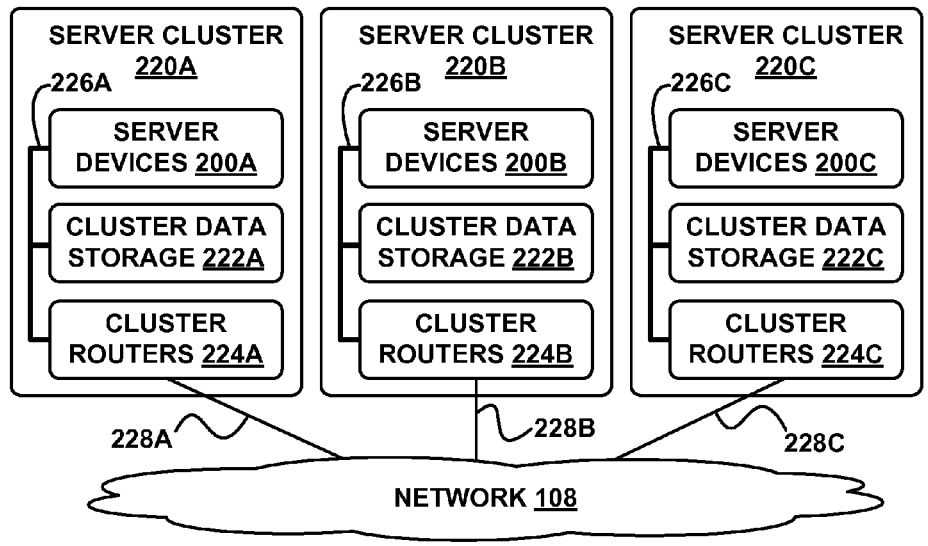
FIG. 2B depicts a cloud-based server system, in accordance with an example embodiment.

FIG. 2B depicts a cloud-based server cluster in accordance with an example embodiment. In FIG. 2B, functions of server device 110 and server data storage device 112 may be distributed among three server clusters 220A, 220B, and 220C. Server cluster 220A may include one or more server devices 200A, cluster data storage 222A, and cluster routers 224A connected by a local cluster network 226A. Similarly, server cluster 220B may include one or more server devices 200B, cluster data storage 222B, and cluster routers 224B connected by a local cluster network 226B. Likewise, server cluster 220C may include one or more server devices 200C, cluster data storage 222C, and cluster routers 224C connected by a local cluster network 226C. Server clusters 220A, 220B, and 220C may communicate with network 108 via communication links 228A, 228B, and 228C, respectively.

In some embodiments, each of the server clusters 220A, 220B, and 220C may have an equal number of server devices, an equal number of cluster data storages, and an equal number of cluster routers. In other embodiments, however, some or all of the server clusters 220A, 220B, and 220C may have different numbers of server devices, different numbers of cluster data storages, and/or different numbers of cluster routers. The number of server devices, cluster data storages, and cluster routers in each server cluster may depend on the computing task(s) and/or applications assigned to each server cluster.

In the server cluster 220A, for example, server devices 200A can be configured to perform various computing tasks of server device 110. In one embodiment, these computing tasks can be distributed among one or more of server devices 200A. Server devices 200B and 200C in server clusters 220B and 220C may be configured the same or similarly to server devices 200A in server cluster 220A. On the other hand, in some embodiments, server devices 200A, 200B, and 200C each may be configured to perform different functions. For example, server devices 200A may be configured to perform one or more functions of server device 110, and server devices 200B and server device 200C may be configured to perform functions of one or more other server devices. Similarly, the functions of server data storage device 112 can be dedicated to a single server cluster, or spread across multiple server clusters.

Cluster data storages 222A, 222B, and 222C of the server clusters 220A, 220B, and 220C, respectively, may be data storage arrays that include disk array controllers configured to manage read and write access to groups of hard disk drives. The disk array controllers, alone or in conjunction with their respective server devices, may also be configured to manage backup or redundant copies of the data stored in cluster data storages to protect against disk drive failures or other types of failures that prevent one or more server devices from accessing one or more cluster data storages.

Similar to the manner in which the functions of server device 110 and server data storage device 112 can be distributed across server clusters 220A, 220B, and 220C, various active portions and/or backup/redundant portions of these components can be distributed across cluster data storages 222A, 222B, and 222C. For example, some cluster data storages 222A, 222B, and 222C may be configured to store backup versions of data stored in other cluster data storages 222A, 222B, and 222C.

Cluster routers 224A, 224B, and 224C in server clusters 220A, 220B, and 220C, respectively, may include networking equipment configured to provide internal and external communications for the server clusters. For example, cluster routers 224A in server cluster 220A may include one or more packet-switching and/or routing devices configured to provide (i) network communications between server devices 200A and cluster data storage 222A via cluster network 226A, and/or (ii) network communications between the server cluster 220A and other devices via communication link 228A to network 108. Cluster routers 224B and 224C may include network equipment similar to cluster routers 224A, and cluster routers 224B and 224C may perform networking functions for server clusters 220B and 220C that cluster routers 224A perform for server cluster 220A.

Additionally, the configuration of cluster routers 224A, 224B, and 224C can be based at least in part on the data communication requirements of the server devices and cluster storage arrays, the data communications capabilities of the network equipment in the cluster routers 224A, 224B, and 224C, the latency and throughput of the local cluster networks 226A, 226B, 226C, the latency, throughput, and cost of the wide area network connections 228A, 228B, and 228C, and/or other factors that may contribute to the cost, speed, fault-tolerance, resiliency, efficiency and/or other design goals of the system architecture.

D. Client Device

Figure 3:
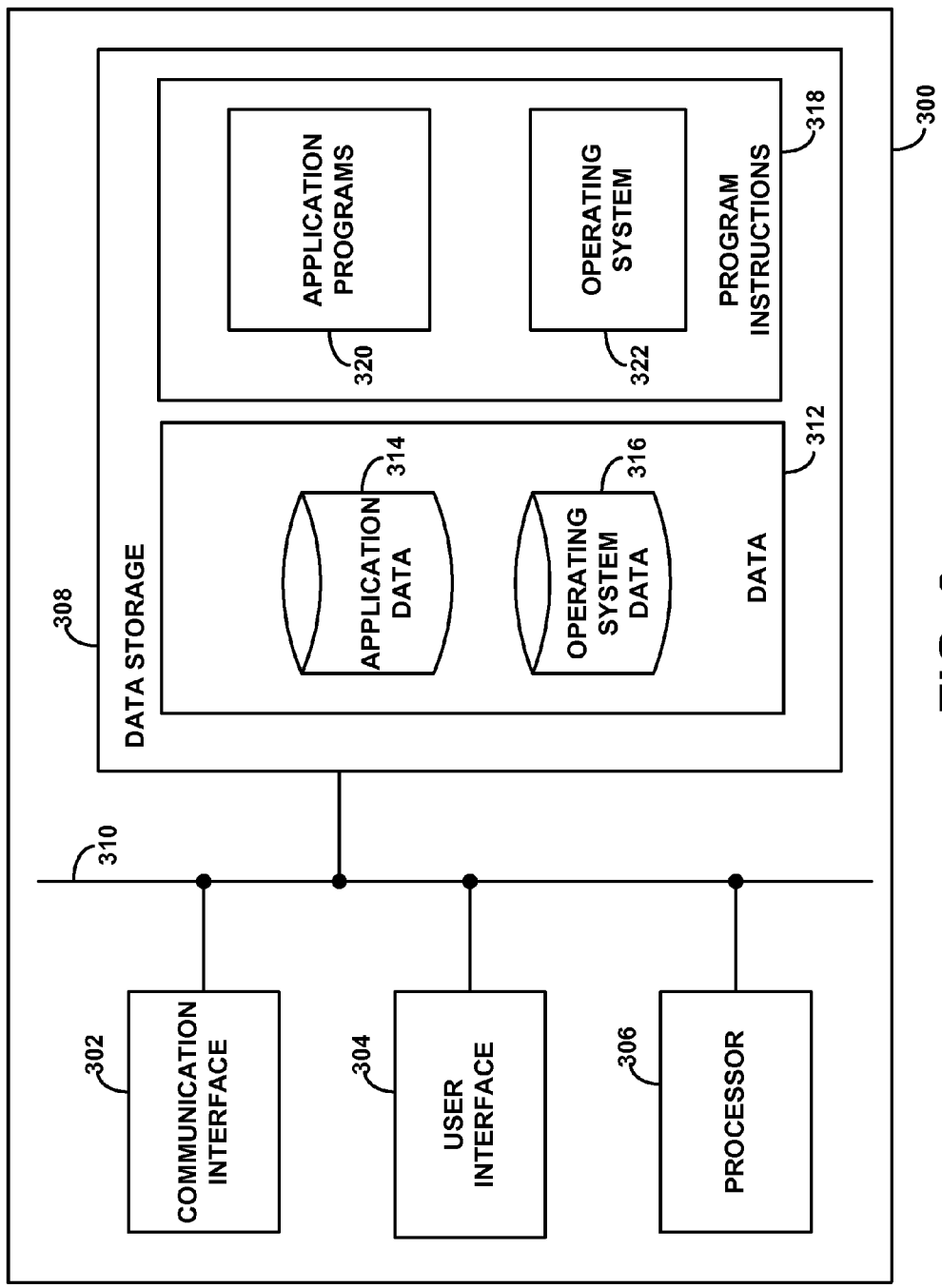
FIG. 3 depicts a block diagram of a client device, in accordance with an example embodiment.

FIG. 3 is a simplified block diagram showing some of the components of an example client device 300. By way of example and without limitation, client device 300 may be a "plain old telephone system" (POTS) telephone, a cellular mobile telephone, a still camera, a video camera, a fax machine, an answering machine, a computer (such as a desktop, notebook, or tablet computer), a personal digital assistant (PDA), a home automation component, a digital video recorder (DVR), a digital TV, a remote control, or some other type of device equipped with one or more wireless or wired communication interfaces.

As shown in FIG. 3, client device 300 may include a communication interface 302, a user interface 304, a processor 306, and data storage 308, all of which may be communicatively linked together by a system bus, network, or other connection mechanism 310.

Communication interface 302 functions to allow client device 300 to communicate, using analog or digital modulation, with other devices, access networks, and/or transport networks. Thus, communication interface 302 may facilitate circuit-switched and/or packet-switched communication, such as POTS communication and/or IP or other packetized communication. For instance, communication interface 302 may include a chipset and antenna arranged for wireless communication with a radio access network or an access point. Also, communication interface 302 may take the form of a wireline interface, such as an Ethernet, Token Ring, or USB port. Communication interface 302 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 302. Furthermore, communication interface 302 may comprise multiple physical communication interfaces (e.g., a Wifi interface, a BLUETOOTH® interface, and a wide-area wireless interface).

User interface 304 may function to allow client device 300 to interact with a human or non-human user, such as to receive input from a user and to provide output to the user. Thus, user interface 304 may include input components such as a keypad, keyboard, touch-sensitive or presence-sensitive panel, computer mouse, trackball, joystick, microphone, still camera and/or video camera. User interface 304 may also include one or more output components such as a display screen (which, for example, may be combined with a presence-sensitive panel), CRT, LCD, LED, a display using DLP technology, printer, light bulb, and/or other similar devices, now known or later developed. User interface 304 may also be configured to generate audible output(s), via a speaker, speaker jack, audio output port, audio output device, earphones, and/or other similar devices, now known or later developed. In some embodiments, user interface 304 may include software, circuitry, or another form of logic that can transmit data to and/or receive data from external user input/output devices. Additionally or alternatively, client device 300 may support remote access from another device, via communication interface 302 or via another physical interface (not shown).

Processor 306 may comprise one or more general purpose processors (e.g., microprocessors) and/or one or more special purpose processors (e.g., DSPs, GPUs, FPUs, network processors, or ASICs). Data storage 308 may include one or more volatile and/or non-volatile storage components, such as magnetic, optical, flash, or organic storage, and may be integrated in whole or in part with processor 306. Data storage 308 may include removable and/or non-removable components.

Generally speaking, processor 306 may be capable of executing program instructions 318 (e.g., compiled or non-compiled program logic and/or machine code) stored in data storage 308 to carry out the various functions described herein. Therefore, data storage 308 may include a non-transitory computer-readable medium, having stored thereon program instructions that, upon execution by client device 300, cause client device 300 to carry out any of the methods, processes, or functions disclosed in this specification and/or the accompanying drawings. The execution of program instructions 318 by processor 306 may result in processor 306 using data 312.

By way of example, program instructions 318 may include an operating system 322 (e.g., an operating system kernel, device driver(s), and/or other modules) and one or more application programs 320 (e.g., address book, email, web browsing, social networking, and/or gaming applications) installed on client device 300. Similarly, data 312 may include operating system data 316 and application data 314. Operating system data 316 may be accessible primarily to operating system 322, and application data 314 may be accessible primarily to one or more of application programs 320. Application data 314 may be arranged in a file system that is visible to or hidden from a user of client device 300.

Application programs 320 may communicate with operating system 312 through one or more application programming interfaces (APIs). These APIs may facilitate, for instance, application programs 320 reading and/or writing application data 314, transmitting or receiving information via communication interface 302, receiving or displaying information on user interface 304, and so on.

In some vernaculars, application programs 320 may be referred to as "apps" for short. Additionally, application programs 320 may be downloadable to client device 300 through one or more online application stores or application markets. However, application programs can also be installed on client device 300 in other ways, such as via a web browser or through a physical interface (e.g., a USB port) on client device 300.

3. Example Automatic Speech Recognition System

Figure 4:
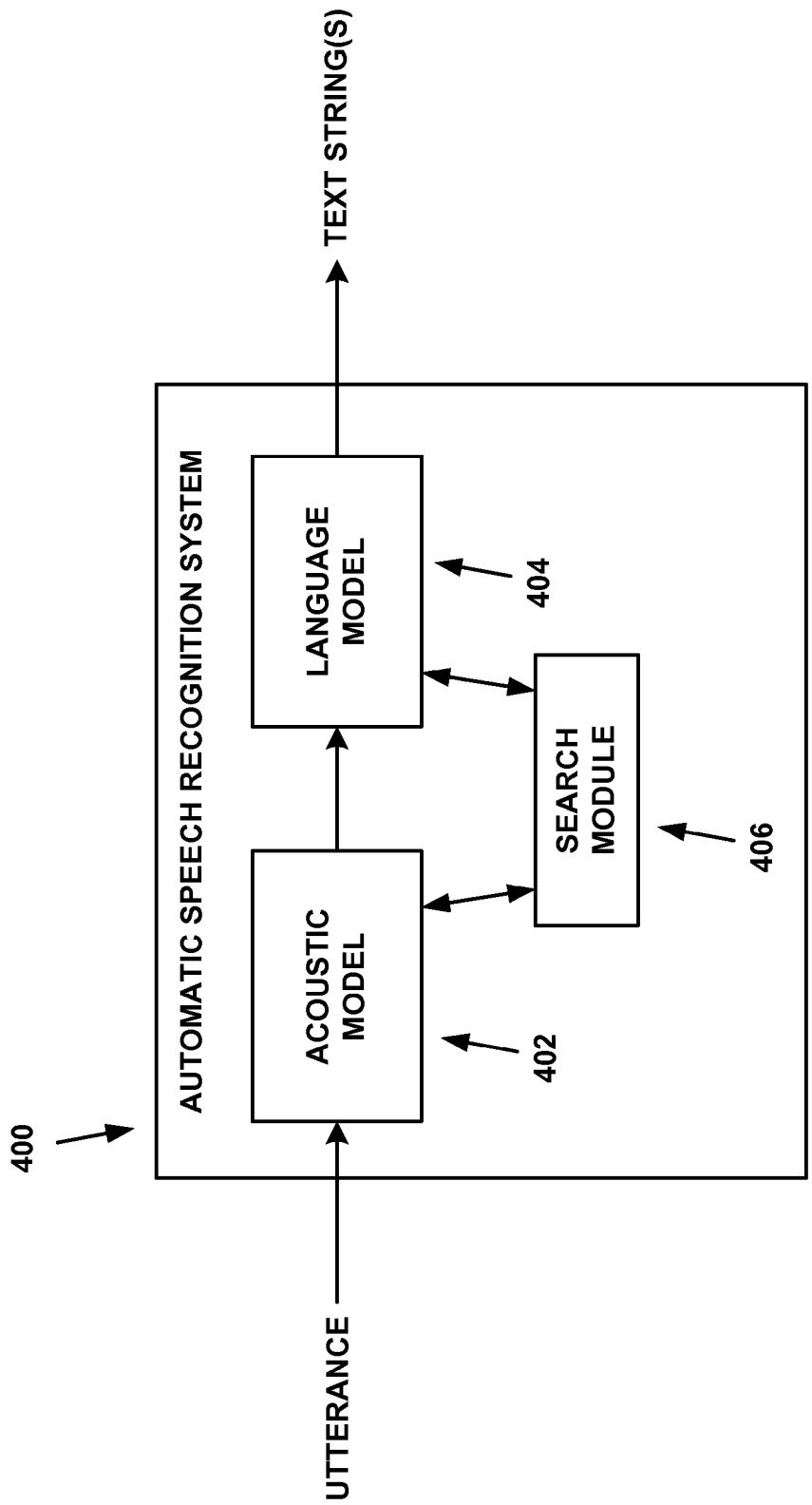
FIG. 4 depicts an ASR system, in accordance with an example embodiment.

FIG. 4 depicts an ASR system 400. Input to ASR system 400 may be an utterance, such as a word, a phrase, a sentence, or a series of sentences. The utterance may take the form of an analog or digital audio signal. Output from ASR system 400 may be one or more text strings that the ASR system has transcribed based on the utterance. While ASR system 400 may seek to produce accurate text string transcriptions of input utterances, this may not always be possible. Thus, for some utterances, ASR system 400 may produce more than one possible text string transcription that could match the utterance. For instance, ASR system may estimate the N-best transcriptions of an utterance, and output one or more of these transcriptions.

ASR system 400 may include several computational models that operate on various levels to transcribe an utterance into text. Words and/or phonemes may be evaluated by acoustic model 402, while sentences and/or phrases may be evaluated by language model 404. Search module 406 may communicate with acoustic model 402 and language model 404 to determine each transcribed word of an input utterance, where this transcription may be based on acoustic model 402 and language model 404.

A. Acoustic Model

As part of the transcription process, an utterance may pass through acoustic model 402. Acoustic model 402 may sample every s milliseconds of the utterance and produce respective output vectors for each sample. These output vectors may be interpreted to estimate phonemes contained therein.

A phoneme may be considered to be the smallest segment of an utterance that encompasses a meaningful contrast with other segments of utterances. Thus, a word typically includes one or more phonemes. For purposes of simplicity, phonemes may be thought of as utterances of letters, but this is not a perfect analogy, as some phonemes may present multiple letters. An example phonemic spelling for the American English pronunciation of the word "cat" is "kaet," consisting of the phonemes "k," "ae," and "t."

Each phoneme may be associated with a different set of nominal output vector values. Thus, acoustic model 402 may be able to estimate the phoneme in the sample by analyzing the sample in the frequency domain and finding the phoneme with nominal output vector values (e.g., frequency characteristics) that best match the output vector values of the sample. Once two or more phonemes are estimated, acoustic model 402 may use a pre-established mapping (e.g., from a dictionary of tens or hundreds of thousands of phoneme pattern to word mappings) to put these phonemes together into words.

Figure 5:
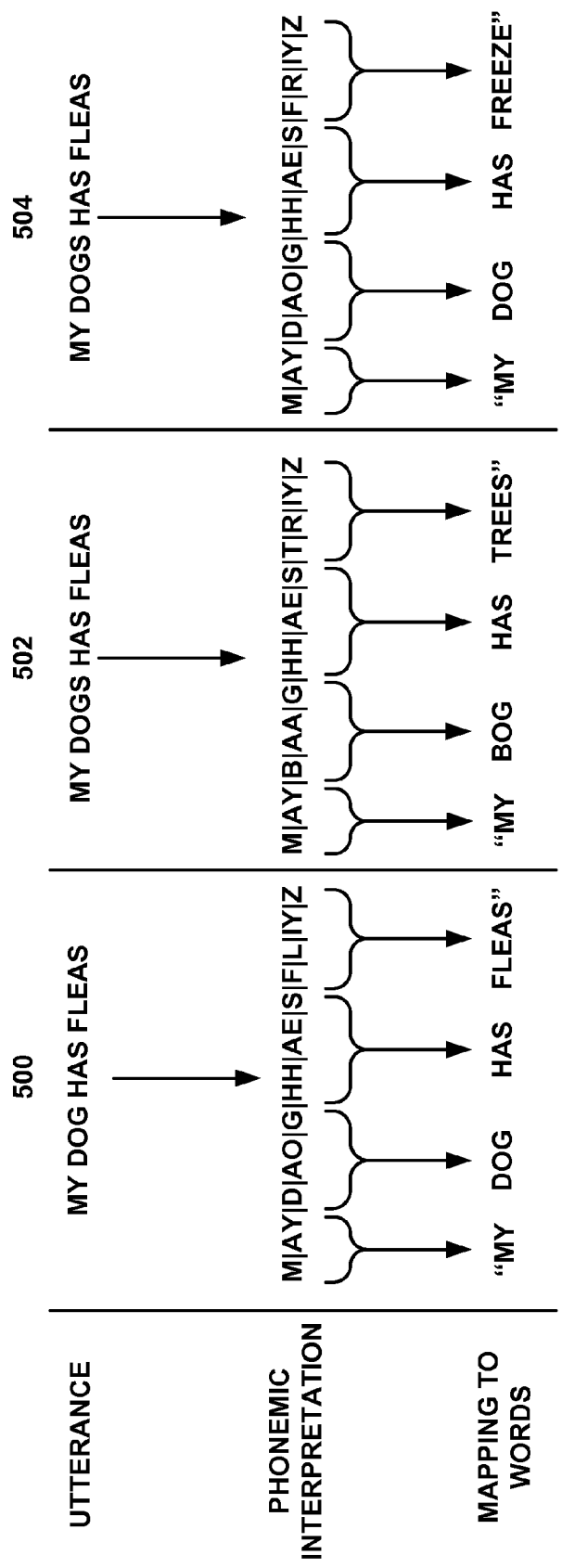
FIG. 5 depicts operation of an acoustic model, in accordance with an example embodiment.

FIG. 5 illustrates three possible acoustic model interpretations of the utterance "my dog has fleas." First, acoustic model 402 may decompose the utterance to a sequence of phonemes. Then, the acoustic model 402 may map one or more phonemes into distinct words.

In interpretation 500, acoustic model 402 correctly interprets the utterance to the text string "my dog has fleas." However, in interpretation 502, some phonemes are incorrectly interpreted. Consequently, acoustic model 402 interprets the utterance as the text string "my bog has trees." In interpretation 504, just one phoneme is incorrectly interpreted, resulting in an interpretation of the text string "my dog has freeze."

The incorrect phonemic interpretations 502 and 504 may occur for various reasons. One of the factors that may contribute to these errors is that recordings of utterances are often imperfect. For example, a user in a noisy environment may record an utterance for purposes of speech recognition. Acoustic model 402 may incorrectly interpret one or more phonemes of this utterance because the acoustic model 402 cannot reliably filter the user's voice from the noise.

Another factor contributing to acoustic model error is the quality of the acoustic model itself. Simply put, some acoustic models result in statistically better performance than others on a particular type of input utterance. For instance, an acoustic model for American English is likely to outperform an acoustic model for British English on utterances spoken in American English. Therefore selection of an appropriate acoustic model can impact the quality of ASR system 400.

One way of implementing an acoustic model, such as acoustic model 402, is by using a hidden Markov model (HMM). Some HMM-based acoustic models may also consider context when performing this mapping. For example, acoustic model 402 may consider the phoneme that precedes the current sample to provide a better estimate of the phoneme represented by the current sample. The use of context in this fashion can account for certain phoneme combinations (e.g., "aet") being more common that other phoneme combinations (e.g., "tk"). But, HMMs are just one technology that can be employed to develop an acoustic model, and acoustic model 402 can be based on technology other than HMMs.

Furthermore, acoustic model 402 may operate on a level other than words. For instance, acoustic model 402 may interpret a series of phonemes as syllables, or as one or more words. For purposes of simplicity, throughout this specification and the accompanying drawings, it is assumed that acoustic models interpret one or more phonemes as words. However, acoustic models that perform other types of interpretations are within the scope of the embodiments herein.

B. Language Model

After acoustic model 402 performs its interpretation, language model 404 may adjust this interpretation based observed patterns of a language. Thus, a language model may operate on n-grams, which are sequences of n units of output from acoustic model 402. As noted above, these units may be, for example, phonemes, syllables, words, or series of words.

An n-gram based language model may define the conditional probability of iv, (the nth word in an n-gram), given the values of the pattern of n−1 previous words in the n-gram. More formally, language model 404 may define $$P(w_n | w_1, w_2, \ldots, w_{n-1})$$

In practice, language models with values of n greater than 5 are rarely used, because of their computational complexity, and also because smaller n-grams (e.g., 3-grams, which are also referred to as tri-grams) tend to yield acceptable results. In the example described below, trigrams are used for purposes of illustration. Nonetheless, any value of n may be may be used with the embodiments herein. For purposes of example, the following discussion assumes the use of tri-grams.

One possible way of determining tri-gram probabilities is to use an existing training corpus of utterance-to-text-string mappings (the text strings may also be referred to as transcriptions). As noted above, these text strings may have been manually transcribed in order to increase accuracy. Then, tri-gram probabilities can be estimated based on their respective number of appearances in the training corpus. In other words, if $C(w_1, w_2, w_3)$ is the number of occurrences of the word pattern $w_1, w_2, w_3$ in the training corpus, then $$P(w_3|w_1, w_2) \approx \frac{C(w_1, w_2, w_3)}{C(w_1, w_2)}$$

However, this technique is not perfect, as some acceptable tri-grams may not appear in the training corpus, and may therefore be assigned a probability of zero. Consequently, when given a zero-probability tri-gram at run time, the language model may instead attempt to map this tri-gram to a different tri-gram associated with a non-zero probability.

In order to reduce this likelihood, the language model may be smoothed so that zero-probability tri-grams have small non-zero probabilities, and the probabilities of the tri-grams in the training corpus are reduced accordingly. In this way, tri-grams not found in the training corpus can still be recognized by the language model.

Alternatively or additionally, the language model may employ a back-off. With this option, if a tri-gram has a probability of zero or a sufficiently low non-zero probability, the language model may ignore the most distant previous word in the tri-gram, and evaluate the resulting bi-gram. If the bi-gram has a probability of zero or a sufficiently low non-zero probability, the language model may back off again and evaluate the resulting one-gram, possibly without considering its context. However, the back-off operation itself may have an associated cost per n-gram so that, in some cases, backing off is unfavorable. For instance, if a bi-gram is common in the training corpus (e.g., the phrase "and the"), a high back-off cost may be associated with the bi-gram. Consequently, the language model is more likely to consider the context of the words in the bi-gram. On the other hand, if a bi-gram is uncommon or not present in the training corpus (e.g., the phrase "the and"), a low back-off cost may be associated with the bi-gram. As a result, the language model is less likely to consider the context of the words in this bi-gram, and may evaluate the words individually instead.

Figure 6:
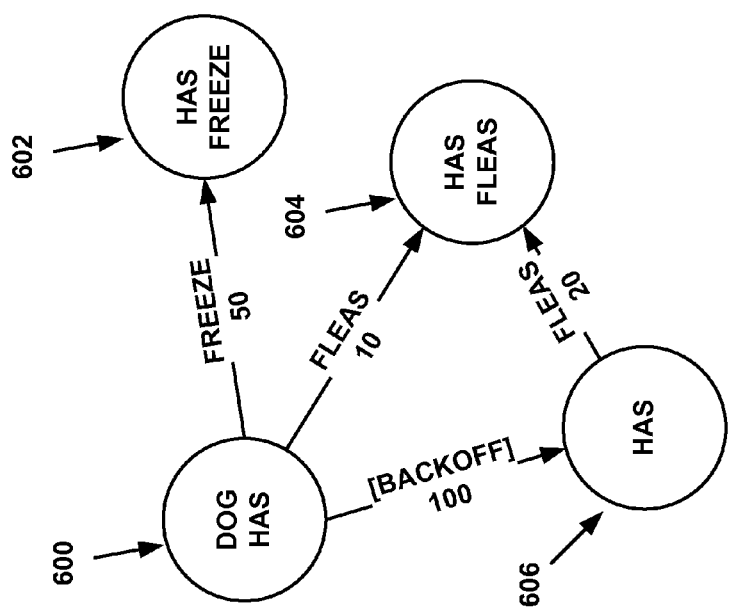
FIG. 6 depicts operation of a language model, in accordance with an example embodiment.

FIG. 6 depicts an example language model in the form of a weighted finite-state automaton (WFA). A WFA consists of a number of states, represented by circles, and transitions between these states, represented by arrows. Each transition is associated with an input and a cost (e.g., a weight). These costs may take on any reasonable values. For instance, the cost of transitioning from a state representing recognition of the word pattern $w_1, w_2$ to a state representing recognition of the word pattern $w_1, w_2, w_3$ may be inversely proportional to the conditional probability given above.

The WFA of FIG. 6 represents an example partial WFA of a language model that uses tri-grams. Thus, in state 600, the two previously evaluated words of an utterance are "dog has," and the language model is attempting to estimate the N-best possible next words. Transitions for two of these next words, "freeze" and "fleas," are shown with their respective transitions to states 602 and 604. Since there is likely to be more occurrences of the phrase "dog has fleas" in the training corpus than the phrase "dog has freeze," a lower cost may be associated with the transition from state 600 to state 604 (a cost of 10) than the transition from state 600 to state 602 (a cost of 50).

Additionally, the transition from state 600 to state 606 represents the language model backing off from using tri-grams to using bi-grams. Since tri-grams starting with "dog has" are fairly common, the cost of this back-off transition may be high (a cost of 100).

Each of states 602 and 604 may be terminal states for utterances that end after the mapping of either "freeze" or "fleas." On the other hand, for utterances that continue, the WFA may also include further states and transitions that are omitted from FIG. 6. Similarly, from state 606, bi-grams starting with the word "has" may be evaluated. Thus, there may be many transitions from state 606 not shown in FIG. 6. Nonetheless, a transition from state 606 to state 604 for the word "fleas" is shown (with a cost of 20). The WFA may or may not include a transition from state 606 to state 602 for the word "freeze."

C. Search Module

Search module 606 may be used to determine a sequence of one or more words that matches an input utterance. More specifically, search module 406 may calculate $$w^* = \mathrm{argmax}_w P(a|w) P(w)$$

where a is a stream of feature vectors derived from the input utterance, P(w|a) represents the probability of those feature vectors being produced by a word sequence w, and P(w) is the probability assigned to w by language model 404. For example, P(w) may be based on n-gram conditional probabilities as discussed above. The function $\mathrm{argmax}_w$ may return the value of w that maximizes P(a|w)P(w).

D. Training a Language Model

One way to train a language model is to use the aforementioned training corpus of utterance-to-text-string mappings to iteratively define a function, $y_i^j = F(x_i)$, j=1 . . . N, that maps input utterance $x_i$ to N candidate text strings, $y_i^j$. One way of iteratively defining F( ) is to build an initial version, $F_1( )$, based on known (e.g., manually transcribed) utterance-to-text-string mappings. Then, $F_1( )$ may be improved by introducing yet more training data in a number of training epochs, thereby creating $F_2( )$, $F_3( )$, and so on. After some number (perhaps a large number) of training epochs, F( ) may converge to an acceptably accurate ASR system.

Formally, given a set of training examples $(x_i, y_i)$, i=1 . . . m of utterances $x_i$ to text strings $y_i$, where $y_i$ is a reference transcription of $x_i$, a feature vector $\Phi(x_i, y_i)$ may be derived. This feature vector may be a multi-dimensional representation of the acoustic model's and/or the language model's parameterization of the utterances $x_i$ and/or the text strings $y_i$. For example, the parameters in the feature vector may include costs associated with $y_i$ from the language model's WFA, counts of associated n-grams, and so on. As noted above, the values of $y_i$, i=1 . . . m may be manual transcriptions or best-known transcriptions of their respective utterances $x_i$. Thus, in some embodiments, $y_i$ may be considered to be a "ground truth" transcription of $x_i$.

A possible goal of the training process may be to determine a weight vector w such that, for a new input utterance of $x_i$, $$y^* = F(x_i) = \mathrm{argmax}_y \Phi(x_i, y) \cdot w$$

produces an accurate (perhaps the best) text string transcription of $x_i$. The argument $\Phi(x_i, \bar{y}) \cdot w$ may be evaluated as the inner product of the two input vectors, and the function $\text{argmax}_{\bar{y}}$ may return the value of $\bar{y}$ that maximizes this inner product. Particularly, each feature in $\Phi(x_i, \bar{y})$ may be paired with a weight from w.

| | Algorithm 1 |
|---|---|
| 1. | w = 0 |
| 2. | FOR t = 1..T |
| 3. | $w_t$ = w |
| 4. | FOR i = 1..m |
| 5. | y* = $\text{argmax}_{\bar{y}} \Phi(x_i, \bar{y}) \cdot w_t$ |
| 6. | IF (y* ≠ $y_i$) THEN |
| 7. | $w_t = w_t + \Phi(x_i, y_i) - \Phi(x_i, y^*)$ |
| 8. | END FOR |
| 9. | w = $w_t$ |
| 10. | END FOR |

Thus, each training example ($x_i$, $y_i$) run through the ASR system may result in w being updated to reflect what the language model has learned from the training example. Particularly, if y*=$y_i$, then F($x_i$) produces the best known transcription of $x_i$ and w need not be changed. However, if y*≠$y_i$, then w may be updated to increase the weights corresponding to the features of $y_i$ and decrease the weights corresponding to the features of y*. In this way, as more and more training samples are run through this process, w may converge so that F($x_i$) is more likely to produce $y_i$.

Algorithm 1 illustrates an example embodiment of the training process for T training iterations or epochs. At line 1, weight vector w is initialized to all zeros. The operations for lines 3 through 9 are performed T times, once per training epoch. These operations include, at line 5, determining y*=F($x_i$), the ASR system's best text-string transcription of $x_i$.

At line 6, y* is compared to $y_i$. If y*=$y_i$, then F($x_i$) has chosen the reference transcription. However, if y*≠$y_i$, F($x_i$) has not chosen the reference transcription, and at line 7 the weight vector for the current epoch, $w_t$ may be updated in an attempt to bring F($x_i$) closer to $y_i$. Particularly, $w_t$ may be adjusted to increase the weights corresponding to the features in $y_i$, and to decrease the weights corresponding to the features in y*. Thus, $\Phi(x_i, y_i)$ is added to $w_t$ and $\Phi(x_i, y^*)$ is subtracted from $w_t$.

At line 9, the weight vector w is updated with the weight adjustments of the current epoch, $w_t$. In this way, over an appropriate number of epochs, w may converge to values that result in F($x_i$) selecting a transcription that is the reference transcription (or close thereto) for a majority of input utterances $x_i$. Further, for an input utterance $x_{new}$ that is not in $x_i$, i=1 . . . m, F($x_{new}$) may be able to produce a text-string transcription that is an acceptably accurate estimate of the ground truth transcription of $x_{new}$.

Figure 7:
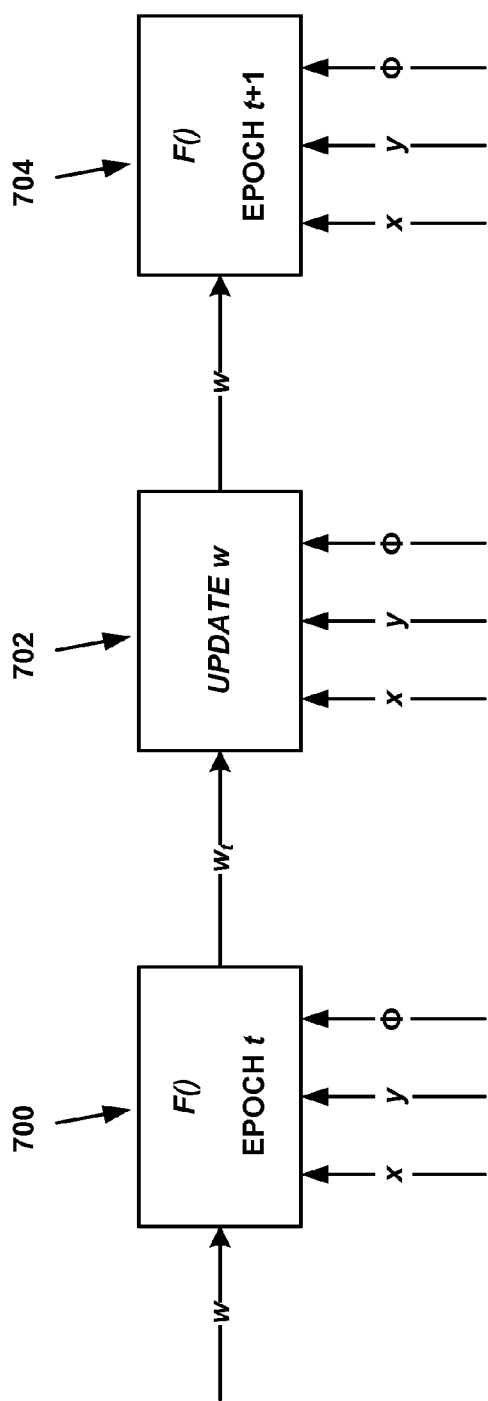
FIG. 7 depicts a multi-epoch ASR system training process, in accordance with an example embodiment.

Algorithm 1 is depicted visually in FIG. 7. Block 700 of FIG. 7 represents epoch t of Algorithm 1. The function F( ) receives weight vector w, input utterances x (where $x_i$, i= 1 . . . m), transcriptions y (where $y_i$, i=1 . . . m), and the feature vector $\Phi$. Applying F( ) to these inputs, block 700 produces adjusted weight vector $w_t$. At block 702, weight vector w may be updated based on $w_t$, x, y, and $\Phi$. Then, at block 704, the process of block 700 may be repeated using the updated version of weight vector w. This process may continue through any number of epochs, potentially hundreds, thousands, or millions of epochs or more.

E. Transcription Confidence Levels

Each particular transcription produced by ASR system 400 may be associated with a respective confidence level. In some embodiments, this confidence level may be a value between zero and one, inclusive, that represents an estimate of the accuracy of the particular transcription. Therefore, a confidence level may estimate a probability that the transcription is correct. In other embodiments, confidence levels may take on values in other ranges, or may be represented with different values.

TABLE 1

Example confidence levels of an utterance and its respective transcriptions.

| Utterance | Acoustic Model Output | Language Model Transcription | Confidence |
|---|---|---|---|
| dog has fleas | "dog has fleas" | "dog has fleas" | 0.95 |
| | | "dog has trees" | 0.03 |
| | | "dog has knees" | 0.02 |

For a particular utterance, some transcriptions will have a higher confidence level than others. Table 1 provides some examples based on a single audio utterance of "dog has fleas." This utterance may be evaluated by the acoustic model (e.g., acoustic model 402). In this case, the acoustic model provides a correct mapping of phonemes to words, producing the text string "dog has fleas."

However, Table 1 shows that there may be three possible language model transcriptions for this acoustic model output. For example, the language model (e.g., language model 404) may account for errors that the acoustic model made in the past, such as evaluating the utterance "dog has trees" as "dog has fleas", and evaluating the utterance "dog has knees" as "dog has fleas."

Accordingly, the language model may assign the text string "dog has fleas" a confidence level of 0.95, the text string "dog has trees" a confidence level of 0.03, and the text string "dog has knees" a confidence level of 0.02. These confidence levels may be based on the conditional probabilities discussed in Section 3B.

Thus, the language model may attempt to correct for likely acoustic model failures. Alternatively, as also discussed in Section 3B, the language model may smooth the conditional probabilities in order to facilitate support for phrases that the language model has not processed as part of its training data.

In some embodiments, confidence levels may only be assigned to the best (highest confidence) transcription. The confidence level value of this best transcription may determine whether the associated utterance-to-text-string mapping, ($x_i$, $y_i$), is retained as part of the training corpus.

4. Additional Example Automatic Speech Recognition System Features

In addition to the functionality described above, other features may be employed in an ASR system that could result in improving the ASR system's performance in at least some situations. Some of these features include training a language model with a weak acoustic model, and distributing (e.g., parallelizing) the language model training process over multiple computing devices. As noted in Section 1, the training processes described herein may occur online to dynamically update an operational ASR system, or offline to update an ASR system that later becomes operational.

A. Training a Language Model with a Weak Acoustic Model

As noted in Section 3A, some acoustic models exhibit statistically better performance than others. For example, the accuracy of an acoustic model may be measured in terms of word error rate. Thus, given a set of utterances, the word error rate of the acoustic model may be the number of words misinterpreted by an acoustic model divided by the total number of words in the utterances. Thus, a strong acoustic model will likely have a lower word error rate than a weak acoustic model.

Nonetheless, perhaps once the ASR system has already been trained with a strong acoustic model, it may be beneficial to continue training the ASR system using a weak acoustic model. Alternatively, the ASR system may be initially trained using a weak acoustic model. Regardless, the weak acoustic model is likely to simulate common misinterpretations that the strong acoustic model might make in a noisy environment. Thus, by training the ASR system to be able to produce better transcriptions in the presence of these misinterpretations, the overall quality of the ASR system may increase.

Further, for an ASR system that has already been trained, this process may not require additional manual transcriptions of utterances. Instead, a set of utterances that has respective transcriptions with a confidence level above of a given threshold (e.g., 0.70, 0.75, 0.80, 0.85, 0.90, 0.95, etc.) may be selected. This set may represent utterances for which the transcription is likely to be the ground truth transcription.

Then, the utterances in this set may be run through the weak acoustic model. While the weak acoustic model may correctly interpret some utterances, it is likely to misinterpret others. The output of the weak acoustic model may then be passed through the language model, which, in turn, may produce one or more possible transcriptions and the respective confidence levels of these transcriptions.

Table 2 shows an example at each step of this process. The input utterance "dog has fleas" is misinterpreted by the weak acoustic model as "dog has freeze." The language model then provides three possible transcriptions, "dog has fleas," "dog has knees," and "dog has freeze," with confidence levels of 0.30, 0.20, and 0.50, respectively.

As illustrated by Table 2, in some embodiments, the N-best utterance-to-text-string mappings may include acoustic model and/or language model scores. These scores may indicate the quality, or confidence level, of the respective mappings. These scores may be later augmented, for example, by the process illustrated in Algorithm 1.

TABLE 2

Example confidence levels of utterances and their respective transcriptions.

| Utterance | Weak Acoustic Model Output | Language model Transcription | Confidence |
|---|---|---|---|
| dog has fleas | "dog has freeze" | "dog has fleas" | 0.30 |
|  |  | "dog has knees" | 0.20 |
|  |  | "dog has freeze" | 0.50 |

These transcriptions may be compared to the reference transcription of "dog has fleas" to determine that "dog has fleas" is most likely the correct transcription. Accordingly, the weight vector w of the language model may be adjusted to increase the weights corresponding to the features in "my dog has fleas," and to decrease the weights corresponding to the features in "my dog has knees" and/or "my dog has freeze."

Consequently, the confidence levels of the language model transcriptions for acoustic model output "dog has freeze" may change. For instance, the transcriptions for "dog has fleas," "dog has knees," and "dog has freeze," may end up with confidence levels of 0.60, 0.10, and 0.30, respectively. In this way, the language model may adapt to properly transcribe the utterance "dog has fleas" even when uttered in a noisy environment.

Figure 8:
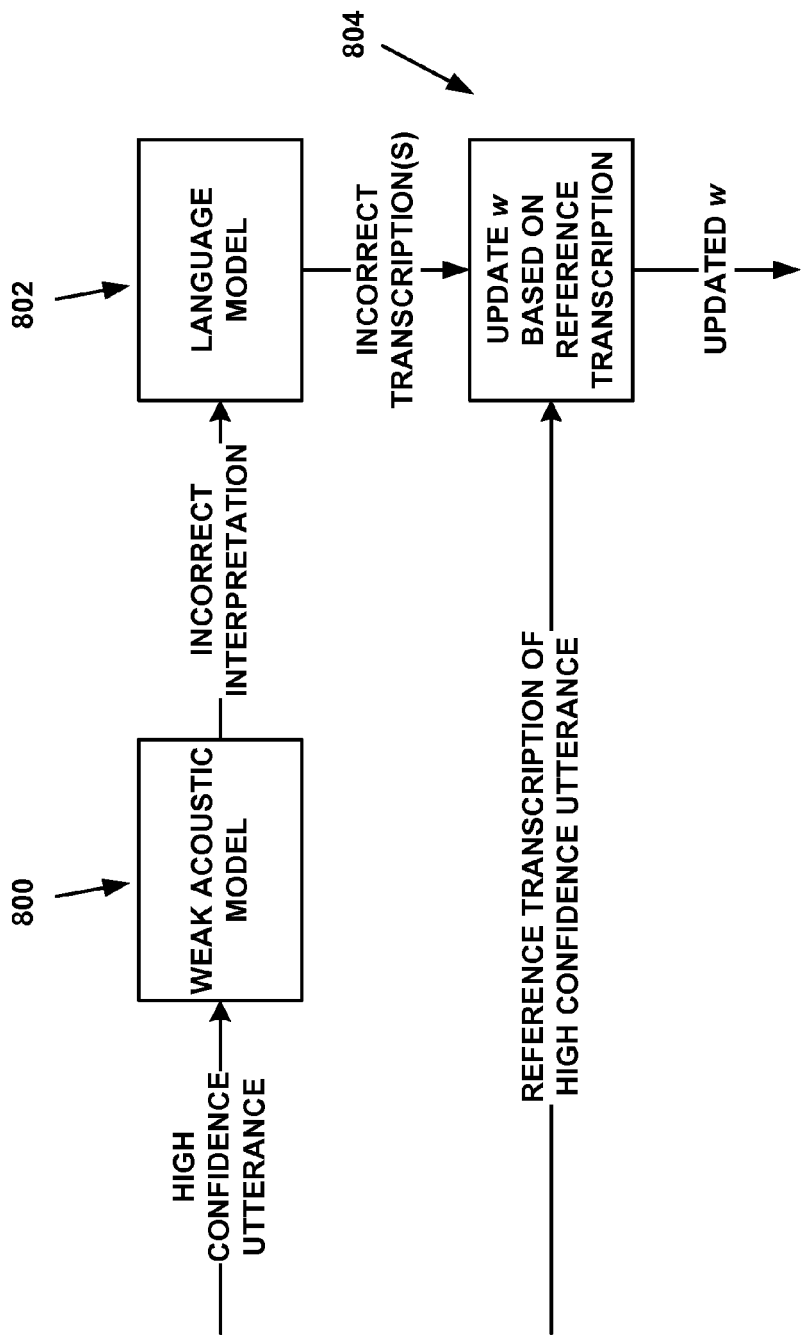
FIG. 8 depicts training an ASR system with a weak acoustic model, in accordance with an example embodiment.

FIG. 8 is an example illustration of this process. At block 800, the weak acoustic model may receive a high confidence utterance, e.g., an utterance with a reference transcription that exceeds a confidence level threshold. The weak acoustic model may produce an incorrect interpretation of this utterance. At block 802, this incorrect interpretation may serve as input to the language model, which in turn, produces one or more possibly incorrect transcriptions of the interpretation. At block 804, these transcriptions may be compared to a reference transcription of the high confidence utterance, and weight vector w may be updated based on the reference transcription. The updated version of w may be produced as output.

B. Distributed Language Model Training

Whether training an ASR system with a strong acoustic model or a weak acoustic model, it is generally beneficial to perform the training with a large number of input utterances and their respective transcriptions. For example, a training corpus may include thousands, tens of thousands, hundreds of thousands, or over a million hours of speech, and thus may include tens of millions or hundreds of millions of individual words.

Figure 9:
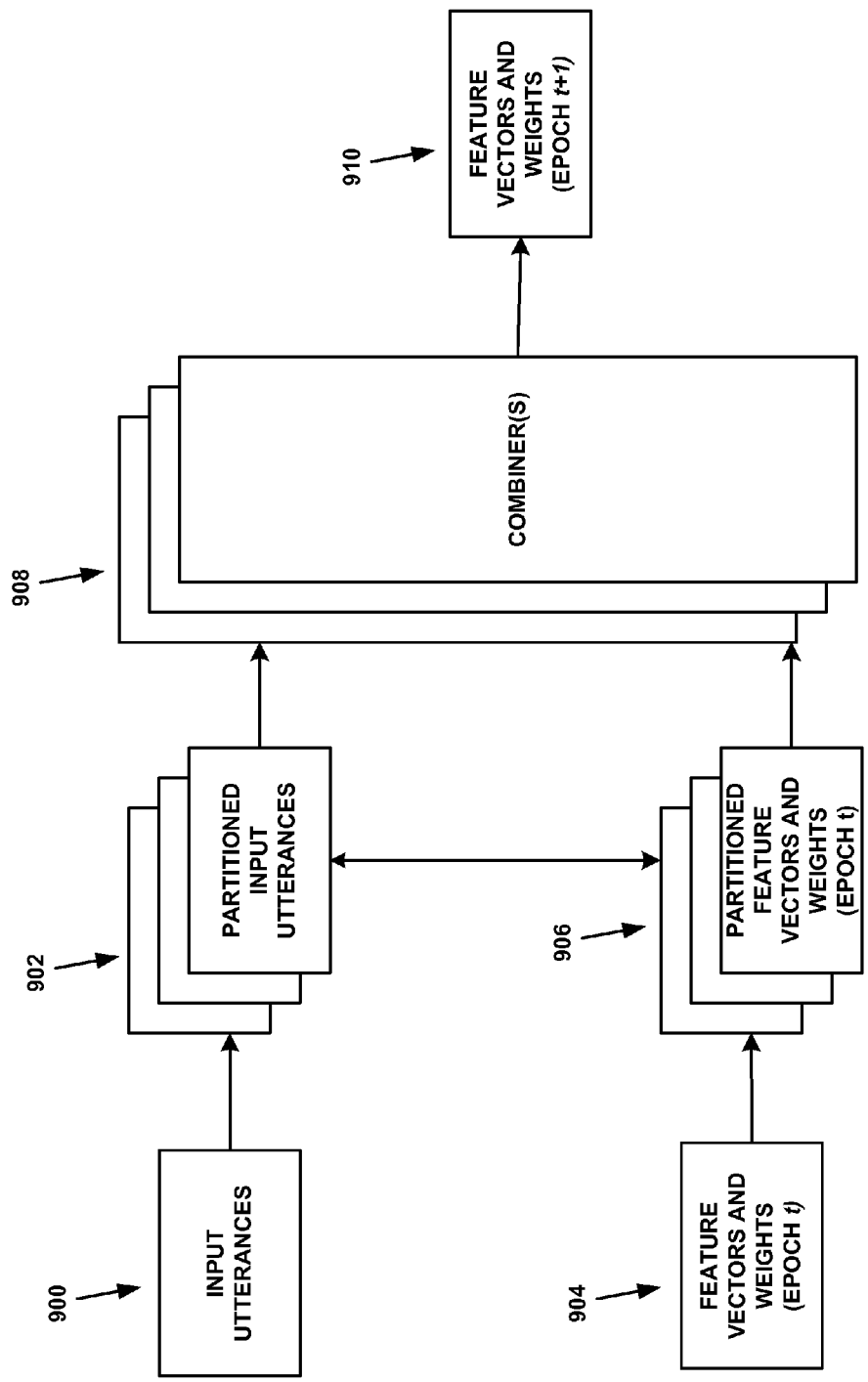
FIG. 9 depicts distributed training of an ASR system, in accordance with an example embodiment.

Given a training corpus of this size, it may be impractical to perform the training steps outline above (see, e.g., Algorithm 1) on a single computing device. By distributing the training across multiple computing devices, the training may occur in parallel, thus reducing the overall time used for training FIG. 9 is a logical diagram illustrating how ASR system training can be distributed over multiple computing devices. Block 900 represents a set of training data in the form of input utterances. Block 902 represents the set of input utterances partitioned into C parts, $\tau_1 \ldots \tau_C$, and distributed over one or more training computing devices. Block 904 represents the ASR parameters for training epoch t, such as the feature vector $\Phi$, weight vector $w_t$, x, and/or y. More or fewer ASR parameters may be represented by block 904. Block 906 represents the ASR parameters for epoch t divided into partitions and distributed over one or more storage computing devices.

In some embodiments, the training computing devices may perform the function $y^* = \operatorname{argmax}_{\bar{y}} \Phi(x_{i,c}, \bar{y}) \cdot w_{t,c}$, where $x_{i,c}$ is the ith input utterance of partition $c = 1 \ldots C$, and $w_{t,c}$ is a local version of weight vector $w_t$ that is being manipulated by the training computing device(s) associated with partition c of the input utterances. The training computing devices may also perform the operation $w_{t,c} = w_{t,c} + \Phi(x_{i,c}, y_{i,c}) - \Phi(x_{i,c}, y^*)$ to update $w_{t,c}$. Further, the training computing devices may, from time to time, retrieve ASR parameters, or portions of these ASR parameters, from the storage computing devices. For instance, rather than retrieving all values of $\Phi$, the training computing devices may communicate with the storage computing devices to retrieve $\Phi(x_{i,c}, y_{i,c})$ and $\Phi(x_{i,c}, y^*)$ as needed.

Block 908 represents one or more combining computing devices that receive, from the computing devices of block 902, $w_{t,c}$ for each partition c. The combining computing devices may then combine these weights in various ways to determine a new weight vector, $w_{t+1}$ for epoch t+1 for the training process. Consequently, block 910 represents the ASR parameters for epoch t+1, such as the feature vector $\Phi$, weight vector $w_{t+1}$, x, and/or y.

The preceding descriptions of the blocks of FIG. 9 are provided for purposes of illustration, and should not be viewed as limiting. Thus, the data and functions described in reference to FIG. 9 may include aspects not explicitly discussed herein. Additionally, these data and functions may be distributed amongst training, storage, and combining computing devices in arrangements not explicitly discussed herein. Further, each of the training, storage, and combining computing devices may be a server device, such as server device 200, and/or a server cluster, such as server cluster 220A. Moreover, the functions of the training, storage, and combining computing devices may be shared by one or more server devices or server clusters.

| Algorithm 2 |
|---|
| 1.    w = 0 |
| 2.    Divide training samples $\tau = (x_i, y_i)$, $i = 1..\eta$ into C partitions, $\tau_1..\tau_C$ |
| 3.    FOR t = 1..T |
| 4.      FOR c = 1..C |
| 5.        $w_{t,c}$ = w |
| 6.        $\Delta_{t,c}$ = 0 |
| 7.        FOR i = 1..\|$\tau_c$\| |
| 8.          $y^* = \text{argmax}_{\bar{y}} \Phi(x_{i,c}, \bar{y}) \cdot w_{t,c}$ |
| 9.          IF ($y^* \neq y_{i,c}$) THEN |
| 10.            $\Delta_{t,c} = \Delta_{t,c} + \Phi(x_{i,c}, y_{i,c}) - \Phi(x_{i,c}, y^*)$ |
| 11.            $w_{t,c} = w + \Delta_{t,c}$ |
| 12.        END FOR |
| 13.      END FOR |
| 14.    w = m($\Delta_{t,c}$) |
| 15.    END FOR |

Regardless of the exact arrangement of computing devices in FIG. 9, the functions of the combining computing devices may vary. Particularly, the combining computing devices may mix the updated weights they receive from the training computing devices in different ways.

Algorithm 2 is a possible implementation of distributed training of an ASR system. At line 1, the weight vector w is initialized to all zeros. At line 2, the $\eta$ training samples $\tau=(x_i, y_i)$ of utterances $x_i$ and their respective transcriptions $y_i$ are divided into C partitions, $\tau_1 \ldots \tau_C$.

The operations for lines 4 through 14 are performed T times, once per training epoch. Additionally, the operations for lines 5 through 12 are performed C times, one per partition. The operations for each of these partitions may be parallelized by distributing them to between two and C training computing devices.

At line 5, a per-epoch, per-partition weight vector $w_{t,c}$ may be initialized to the value of w. At line 6, a per-epoch, per-partition iterator vector, $\Delta_{t,c}$, may be initialized to all zeros.

The operations for lines 8 through 11 are performed $|\tau_c|$ times, once for each utterance and its associated transcription. These operations include, at line 8, determining $y^* = F(x_{i,c}) = \text{argmax}_{\bar{y}} \Phi(x_{i,c}, \bar{y}) \cdot w_{t,c}$, the ASR system's best text-string transcription of utterance $x_{i,c}$. At line 9, $y^*$ is compared to reference transcription $y_{i,c}$. If $y^* = y_{i,c}$, $F(x_{i,c})$ has chosen the reference transcription. However, if $y^* \neq y_{i,c}$, $F(x_{i,c})$ has not chosen the reference transcription, and at line 10 the iterator vector $\Delta_{t,c}$ may be updated to increase the weights corresponding to the features in $y_{i,c}$, and to decrease the weights corresponding to the features in $y^*$. At line 11, the weight vector $w_{t,c}$ may be set to the most recent value of w plus $\Delta_{t,c}$. In this way, $\Delta_{t,c}$ reflects the total change made to w by the processing of partition c, and may be maintained on a per-partition basis by a training computing device.

At line 14, the combining computing device(s) may collect the C versions of $\Delta_{t,c}$ from the training computing devices. The combining computing device(s) may update w by using mixing function m( ). At a minimum m( ) may take each of the iterator vectors, $\Delta_{t,c}$, of the current epoch t.

In a first example embodiment, m( ) may perform a sum over all of the iterator vectors. In this case, $m(\Delta_{t,c}) = w + \Sigma_{C=1}^{C} \Delta_{t,c}$. In a second example embodiment, m( ) may perform a sum over all of the iterator vectors, but average this sum over the total number of partitions C. In this case, $m(\Delta_{t,c}) = w + 1/C \Sigma_{C=1}^{C} \Delta_{t,c}$. In a third example embodiment $$m(\Delta_{t,c}) = \frac{t-1}{t} w + \frac{1}{t}\left(w + \frac{1}{C}\sum_{c=1}^{c} \Delta_{t,c}\right) + \frac{1}{\eta}\sum_{c=1}^{C} S_{t,c}$$

where $$S_{t,c} = \sum_{j=1}^{|\tau_c|} \sum_{k=1}^{j} (\Phi(x_{k,c}, y_{k,c}) - \Phi(x_{k,c} \bar{y}_{k,c}))$$

Thus, for the third example embodiment, m( ) may update the weight vector w by using a form of moving average over the previous value of w and the changes to w due to the current training epoch t. In this embodiment, m( ) may effectively average weights across substantively all training samples and all training epochs.

Nonetheless, these mixing functions may be modified without departing from the scope of the embodiments disclosed herein. Further, other mixing functions may be used instead of the three example mixing functions shown above.

5. Example Operations

Figure 10:
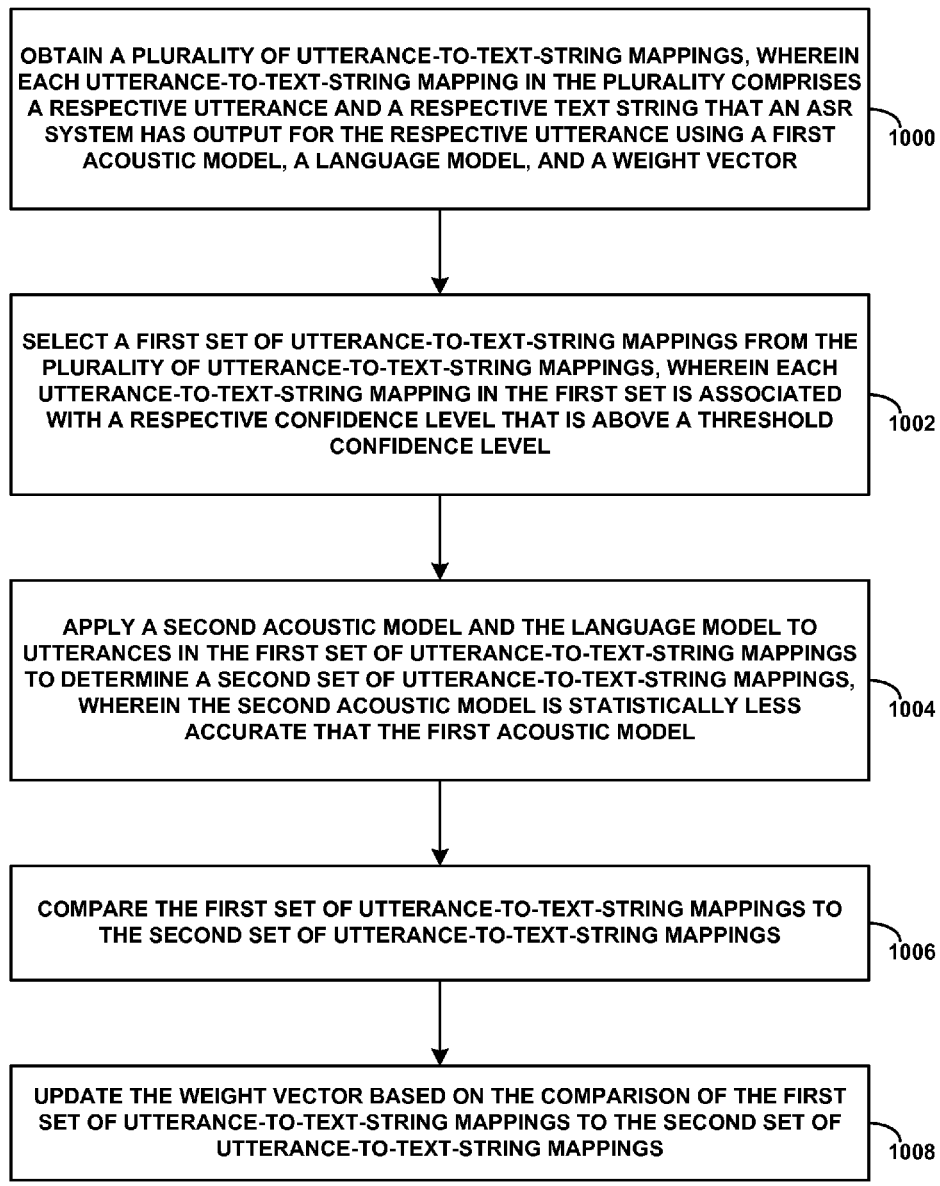
FIG. 10 is a flow chart, in accordance with an example embodiment.

FIG. 10 is a flow chart of an example embodiment. The steps illustrated by this flow chart may be carried out by one or more computing devices, such as server device 200 or server cluster 220A. Further, aspects of each individual step may be distributed between multiple computing devices.

At step 1000, a plurality of utterance-to-text-string mappings may be obtained. Each utterance-to-text-string mapping in the plurality may include a respective utterance and a respective text string that an ASR system has output for the respective utterance using a first acoustic model, a language model, and a weight vector. The first acoustic model may map utterances to phonemes. The language model may use n-gram representations of phrases to determine utterance-to-text-string mappings.

At step 1002, a first set of utterance-to-text-string mappings may be selected from the plurality of utterance-to-text-string mappings. Each utterance-to-text-string mapping in the first set may be associated with a respective confidence level that is above a threshold confidence level.

At step 1004, a second acoustic model and the language model may be applied to utterances in the first set of utterance-to-text-string mappings to determine a second set of utterance-to-text-string mappings. The second acoustic model may also map utterances to phonemes. In some embodiments, the second acoustic model may be statistically less accurate than the first acoustic model. For example, the second acoustic model may have a higher word error rate than the first acoustic model.

Additionally, each mapping of the first set of utterance-to-text-string mappings may be associated with a respective feature vector. The respective feature vector may define at least one characteristic related to the respective utterance-to-text-string mapping. Applying the second acoustic model and the language model to utterances of the first set may involve determining respective inner products of the weight vector and each of the respective feature vectors.

At step 1006, the first set of utterance-to-text-string mappings may be compared to the second set of utterance-to-text-string mappings. At step 1008, the weight vector may be updated based on the comparison of the first set of utterance-to-text-string mappings to the second set of utterance-to-text-string mappings.

Partitions of the first set of utterance-to-text-string mappings may be distributed to a plurality of training computing devices. Each of the plurality of training computing devices may apply the second acoustic model and the language model to the partitions of the first set to produce a respective weight vector adjustment. At least one combining computing device may update the weight vector in accordance with the weight vector adjustments. Updating the weight vector may involve the at least one combining computing device summing the respective weight vector adjustments to update the weight vector, averaging the respective weight vector adjustments to update the weight vector, and/or using a moving average over the weight vector and the respective weight vector adjustments to update the weight vector.

In some embodiments, applying the second acoustic model and the language model to utterances of the first set of utterance-to-text-string mappings may involve estimating a text string transcription for a particular utterance in the first set of utterance-to-text-string mappings. A first feature vector may characterize the estimated text string transcription of the particular utterance, and comparing the first set of utterance-to-text-string mappings to the second set of utterance-to-text-string mappings may include comparing the estimated text string transcription to a reference text string transcription of the particular utterance. Further, a second feature vector may characterize the reference text string transcription of the particular utterance, and updating the weight vector based on the comparison of the first set of utterance-to-text-string mappings to the second set of utterance-to-text-string mappings may include adding the second feature vector to the weight vector and subtracting the first feature vector from the weight vector.

Further, a computing device may receive an input utterance from a client device. Possibly in response to receiving the input utterance, the computing device may apply the ASR system to the input utterance to determine an output text string. In doing so, the ASR system may use the updated weight vector. The computing device may transmit the output text string to the client device.

In another example embodiment that is illustrated by both FIGS. 9 and 10, a system may include a plurality of storage computing devices, a plurality of training computing devices, and at least one combining computing device.

Each of the storage computing devices may be configured to store a respective set of feature vectors and to have access to a weight vector. The respective sets of feature vectors and the weight vector may be based on a plurality of utterance-to-text-string mappings. Each utterance-to-text-string mapping in the plurality may include a respective utterance and a respective text string that an ASR system has output for the respective utterance using a first acoustic model, and a language model. The first acoustic model may map utterances to phonemes, and the language model may use n-gram representations of phrases to determine utterance-to-text-string mappings.

Each of the training computing devices may have access to a respective partition of a first set of utterance-to-text-string mappings that (i) was selected from the plurality of utterance-to-text-string mappings, and (ii) is associated with a respective confidence level that is above a threshold confidence level.

Each training computing device may also be configured to apply a second acoustic model and the language model to the respective utterances of the first set to determine a second set of utterance-to-text-string mappings. In some embodiments, the second acoustic model and the language model may be applied to at least one of the partitions of the first set to produce a respective weight vector adjustment. Applying the second acoustic model and the language model to the respective utterances of the first set may involve determining respective inner products of the weight vector and one of the sets of feature vectors.

The second acoustic model may map utterances to phonemes, and may be statistically less accurate than the first acoustic model. For example, the second acoustic model may have a higher word error rate than the first acoustic model. On the other hand, the second acoustic model may be the same as the first acoustic model.

Each training computing device may additionally be configured to compare the first set of utterance-to-text-string mappings to the second set of utterance-to-text-string mappings.

The combining computing device(s) may be configured to update the weight vector based on the comparison of the first set of utterance-to-text-string mappings to the second set of utterance-to-text-string mappings. The combining computing device(s) may also be configured to sum the respective weight vector adjustments to update the weight vector, average the respective weight vector adjustments to update the weight vector, and/or use a moving average over the weight vector and the respective weight vector adjustments to update the weight vector.

In some embodiments, applying the second acoustic model and the language model to the respective utterances of the first set may involve estimating a text string transcription for a particular utterance in the first set of utterance-to-text-string mappings, where a first feature vector characterizes the estimated text string transcription of the particular utterance. In these embodiments, comparing the first set of utterance-to-text-string mappings to the second set of utterance-to-text-string mappings may include comparing the estimated text string transcription to a reference text string transcription of the particular utterance, where a second feature vector characterizes the reference text string transcription of the particular utterance. Additionally, updating the weight vector based on the comparison of the first set of utterance-to-text-string mappings to the second set of utterance-to-text-string mappings may include adding the second feature vector to the weight vector and subtracting the first feature vector from the weight vector.

6. Conclusion

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium such as a storage device including a disk or hard drive or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method comprising:
    determining, by a computing system, a reference transcription of a reference utterance, wherein the reference transcription is derived using a strong acoustic model, a language model and a weight vector, and wherein the reference transcription has a confidence level of at least 70%;
    based on the reference transcription having the confidence level of at least 70%, determining a secondary transcription of the reference utterance, wherein the secondary transcription is derived using a weak acoustic model, the language model and the weight vector, wherein the secondary transcription has a secondary confidence level, wherein the weak acoustic model has a higher error rate than the strong acoustic model, and wherein the secondary transcription is different from the reference transcription; and
    based on the secondary transcription being different from the reference transcription, updating the weight vector so that transcribing the reference utterance using the weak acoustic model, the language model and the updated weight vector results in a tertiary transcription with a tertiary confidence level that is greater than the secondary confidence level.

2. The method of claim 1, wherein the secondary confidence level is less than the confidence level.

3. The method of claim 1, wherein the strong acoustic model provides a correct phonemic interpretation of the reference utterance, and the weak acoustic model provides an incorrect phonemic interpretation of the reference utterance.

4. The method of claim 1, further comprising:
    receiving an input utterance from a client device;
    determining an output transcription of the input utterance, wherein the output transcription is derived using the strong acoustic model, the language model, and the updated weight vector; and
    transmitting the output transcription to the client device.

5. The method of claim 1, wherein the reference transcription and the reference utterance are associated with a feature vector that defines at least one characteristic related to the reference transcription and the reference utterance, and wherein determining a secondary transcription of the reference utterance comprises determining an inner product of the weight vector and the feature vector.

6. The method of claim 1, wherein a first feature vector characterizes the reference transcription, wherein a second feature vector characterizes the secondary transcription, and wherein updating the weight vector comprises adding the first feature vector to the weight vector and subtracting the second feature vector from the weight vector.

7. The method of claim 6, wherein updating the weight vector comprises calculating a moving average over the weight vector and the first and second feature vectors.

8. The method of claim 1, wherein the reference transcription and the reference utterance are stored on a storage computing device of the computing system, wherein determining the secondary transcription of the reference utterance is performed by a training computing device of the computing system, and wherein updating the weight vector is performed by a combining computing device of the computing system.

9. An article of manufacture including a non-transitory computer-readable storage medium, having stored thereon program instructions that, upon execution by a computing device, cause the computing device to perform operations comprising:
    determining a reference transcription of a reference utterance, wherein the reference transcription is derived using a strong acoustic model, a language model and a weight vector, and wherein the reference transcription has a confidence level of at least 70%;
    based on the reference transcription having the confidence level of at least 70%, determining a secondary transcription of the reference utterance, wherein the secondary transcription is derived using a weak acoustic model, the language model and the weight vector, wherein the secondary transcription has a secondary confidence level, wherein the weak acoustic model has a higher error rate than the strong acoustic model, and wherein the secondary transcription is different from the reference transcription; and based on the secondary transcription being different from the reference transcription, updating the weight vector so that transcribing the reference utterance using the weak acoustic model, the language model and the updated weight vector results in a tertiary transcription with a tertiary confidence level that is greater than the secondary confidence level.

10. The article of manufacture of claim 9, wherein the secondary confidence level is less than the confidence level.

11. The article of manufacture of claim 9, wherein the strong acoustic model provides a correct phonemic interpretation of the reference utterance, and the weak acoustic model provides an incorrect phonemic interpretation of the reference utterance.

12. The article of manufacture of claim 9, wherein the operations further comprise:
  receiving an input utterance from a client device;
  determining an output transcription of the input utterance, wherein the output transcription is derived using the strong acoustic model, the language model, and the updated weight vector; and
  transmitting the output transcription to the client device.

13. The article of manufacture of claim 9, wherein the reference transcription and the reference utterance are associated with a feature vector that defines at least one characteristic related to the reference transcription and the reference utterance, and wherein determining a secondary transcription of the reference utterance comprises determining an inner product of the weight vector and the feature vector.

14. The article of manufacture of claim 9, wherein a first feature vector characterizes the reference transcription, wherein a second feature vector characterizes the secondary transcription, and wherein updating the weight vector comprises adding the first feature vector to the weight vector and subtracting the second feature vector from the weight vector.

15. The article of manufacture of claim 14, wherein updating the weight vector comprises calculating a moving average over the weight vector and the first and second feature vectors.

16. The article of manufacture of claim 9, wherein the reference transcription and the reference utterance are stored on a storage computing device of a computing system, wherein determining the secondary transcription of the reference utterance is performed by a training computing device of the computing system, and wherein updating the weight vector is performed by a combining computing device of the computing system.

17. A computing system comprising:
  a plurality of storage computing devices, each configured to store a respective set of reference transcriptions of reference utterances, and a respective set of feature vectors, and to have access to a weight vector, wherein the respective sets of reference transcriptions were derived using a strong acoustic model, a language model and the weight vector, and wherein each feature vector is pairwise associated with a reference utterance stored on the same storage computing device;
  a plurality of training computing devices each configured to select a respective partition of the reference utterances, wherein each reference utterance in the respective partition is associated with a respective confidence level of at least 70%, wherein each training computing device is configured to, based on the reference transcription having the confidence level of at least 70%, apply a weak acoustic model, the language model, and the weight vector to the of reference utterances in the respective partition to determine a set of respective secondary transcriptions, wherein the respective secondary transcriptions have respective secondary confidence levels, wherein the weak acoustic model has a higher error rate than the strong acoustic model, and wherein at least some respective secondary transcriptions are different from the respective reference transcriptions; and
  at least one combining computing device configured to, based on the feature vectors associated with the reference utterances of the selected partitions, update the weight vector so that transcribing the respective reference utterances using the weak acoustic model, the language model and the updated weight vector results in respective tertiary transcriptions with respective tertiary confidence levels that are greater than the respective secondary confidence levels.

18. The computing system of claim 17, wherein the respective secondary confidence levels are less than the respective confidence levels.

19. The computing system of claim 17, wherein each of the plurality of training computing devices applying the weak acoustic model, the language model, and the weight vector to the respective selected partitions of reference utterances produces respective weight vector adjustments.

20. The computing system of claim 19, wherein the at least one combining computing device is configured to sum the respective weight vector adjustments to update the weight vector.

21. The computing system of claim 19, wherein the at least one combining computing device is configured to average the respective weight vector adjustments to update the weight vector.

22. The computing system of claim 19, wherein the at least one combining computing device is configured to calculate a moving average over the weight vector and the respective weight vector adjustments to update the weight vector.

23. The computing system of claim 19, wherein applying the weak acoustic model, the language model, and the weight vector to the respective selected partitions of reference utterances comprises determining respective inner products of the weight vector and the respective feature vectors associated with the respective reference utterances.

* * * * *